US012660797B2

(12) United States Patent
Anderton et al.

(10) Patent No.: US 12,660,797 B2
(45) Date of Patent: Jun. 23, 2026

(54) SYSTEM AND METHOD FOR DETERMINING AN ANIMAL COMPATIBILITY SCORE AND RECOMMENDATION

(71) Applicant: Protect Animals with Satellites, LLC, Upper Saddle River, NJ (US)

(72) Inventors: Terry Anderton, Hampton Falls, NH (US); Kenneth Scott Ehrman, Upper Saddle River, NJ (US); Michael Ehrman, Plano, TX (US)

(73) Assignee: Protect Animals with Satellites, LLC, Upper Saddle River, NJ (US)

( * ) Notice: Subject to any disclaimer, the term of this patent is extended or adjusted under 35 U.S.C. 154(b) by 95 days.

(21) Appl. No.: 18/386,063

(22) Filed: Nov. 1, 2023

(65) Prior Publication Data

US 2024/0138373 A1    May 2, 2024

Related U.S. Application Data

(60) Provisional application No. 63/421,640, filed on Nov. 2, 2022.

(51) Int. Cl.
*A01K 15/02*          (2006.01)
*A01K 27/00*          (2006.01)
(52) U.S. Cl.
CPC .......... *A01K 15/021* (2013.01); *A01K 27/009* (2013.01)
(58) Field of Classification Search
None
See application file for complete search history.

(56) References Cited

U.S. PATENT DOCUMENTS

| | | | |
|---|---|---|---|
| 5,067,441 A | 11/1991 | Weinstein | |
| 5,576,994 A | 11/1996 | Kato et al. | |
| 5,857,433 A | 1/1999 | Files | |
| 5,868,100 A | 2/1999 | Marsh | |
| 6,043,748 A | 3/2000 | Touchton et al. | |
| 6,166,643 A | 12/2000 | Janning et al. | |

(Continued)

FOREIGN PATENT DOCUMENTS

| | | |
|---|---|---|
| CA | 2865966 C | 7/2021 |
| CN | 101713822 B | 8/2013 |

(Continued)

OTHER PUBLICATIONS

Alvaro Llaria; Geolocation and Monitoring Platform for Extensive Farming in Mountain Pastures ("Llaria"); IEEE International Conference on Industrial Technology (ICIT), pp. 2420-2425; Mar. 19, 2015.

(Continued)

*Primary Examiner* — Muhammad Adnan
(74) *Attorney, Agent, or Firm* — Epstein Drangel LLP; Jodi-Ann McLane

(57)    ABSTRACT

The disclosed technology includes a system and method for determining an animal compatibility score and recommendation based a dog's profile which includes breed and personality traits, an interaction detection and analysis algorithm, and scoring feedback from other users who have interacted with the animals. The disclosed technology can further include activating a keep-away mode that is configured to discourage an animal from coming near another animal that it is incompatible with.

15 Claims, 11 Drawing Sheets

(56) References Cited

U.S. PATENT DOCUMENTS

| | | | |
|---|---|---|---|
| 6,232,880 | B1 | 5/2001 | Anderson et al. |
| 6,232,916 | B1 | 5/2001 | Grillo et al. |
| 6,271,757 | B1 | 8/2001 | Touchton et al. |
| 6,487,992 | B1 | 12/2002 | Hollis |
| 6,581,546 | B1 | 6/2003 | Dalland et al. |
| 6,683,564 | B1 | 1/2004 | McBurney |
| 6,700,492 | B2 | 3/2004 | Touchton et al. |
| 6,903,682 | B1 | 6/2005 | Maddox |
| 6,928,958 | B2 | 8/2005 | Crist et al. |
| 7,000,570 | B2 | 2/2006 | Napolez et al. |
| 7,017,524 | B2 | 3/2006 | Gillis et al. |
| 7,046,152 | B1 | 5/2006 | Peinetti et al. |
| 7,068,174 | B1 | 6/2006 | Peinetti et al. |
| 7,110,777 | B2 | 9/2006 | Duncan |
| 7,111,586 | B2 | 9/2006 | Lee et al. |
| 7,117,822 | B1 | 10/2006 | Peinetti et al. |
| 7,174,855 | B2 | 2/2007 | Gerig et al. |
| 7,198,009 | B2 | 4/2007 | Crist et al. |
| 7,204,204 | B1 | 4/2007 | Peinetti et al. |
| 7,222,589 | B2 | 5/2007 | Lee, IV et al. |
| 7,252,051 | B2 | 8/2007 | Napolez et al. |
| 7,259,718 | B2 | 8/2007 | Patterson et al. |
| 7,278,376 | B1 | 10/2007 | Peinetti et al. |
| 7,343,879 | B2 | 3/2008 | Gerig et al. |
| 7,345,588 | B2 | 3/2008 | Gerig |
| 7,360,505 | B2 | 4/2008 | Gerig et al. |
| 7,394,390 | B2 | 7/2008 | Gerig |
| 7,409,924 | B2 | 8/2008 | Kates |
| 7,495,570 | B1 | 2/2009 | Peinetti et al. |
| 7,552,699 | B2 | 6/2009 | Moore |
| 7,565,885 | B2 | 7/2009 | Moore |
| 7,602,302 | B2 | 10/2009 | Hokuf et al. |
| 7,667,642 | B1 | 2/2010 | Frericks et al. |
| 7,710,263 | B2 | 5/2010 | Boyd |
| 7,779,788 | B2 | 8/2010 | Moore |
| 7,861,676 | B1 | 1/2011 | Kates |
| 7,946,252 | B2 | 5/2011 | Lee, IV et al. |
| 8,011,327 | B2 | 9/2011 | Mainini et al. |
| 8,018,334 | B1 | 9/2011 | DiMartino et al. |
| 8,152,745 | B2 | 4/2012 | Smith et al. |
| 8,239,133 | B2 | 8/2012 | Wang et al. |
| 8,342,135 | B2 | 1/2013 | Peinetti et al. |
| 8,430,064 | B2 | 4/2013 | Groh et al. |
| 8,436,735 | B2 | 5/2013 | Mainini |
| 8,448,607 | B2 | 5/2013 | Giunta |
| 8,704,728 | B2 | 4/2014 | Mujahed et al. |
| 8,736,499 | B2 | 5/2014 | Goetzl et al. |
| 8,779,925 | B2 | 7/2014 | Rich et al. |
| 8,803,692 | B2 | 8/2014 | Goetzl et al. |
| 8,823,513 | B2 | 9/2014 | Jameson et al. |
| 8,839,744 | B1 | 9/2014 | Bianchi et al. |
| 8,934,923 | B1 | 1/2015 | Golden |
| 8,935,093 | B2 | 1/2015 | Chansarkar |
| 8,939,111 | B2 | 1/2015 | Berntsen |
| 8,947,240 | B2 | 2/2015 | Mainini |
| 8,947,241 | B2 | 2/2015 | Trenkle et al. |
| 8,955,462 | B1 | 2/2015 | Golden |
| 8,972,180 | B1 | 3/2015 | Zhao et al. |
| 8,978,592 | B2 | 3/2015 | Duncan et al. |
| 9,146,113 | B1 | 9/2015 | Funk et al. |
| 9,173,380 | B2 | 11/2015 | Trenkle et al. |
| 9,258,982 | B1 | 2/2016 | Golden |
| 9,538,329 | B1 | 1/2017 | Vivathana |
| 9,648,849 | B1 | 5/2017 | Vivathana |
| 9,654,925 | B1 | 5/2017 | Solinsky et al. |
| 9,848,295 | B1 | 12/2017 | Mason et al. |
| 9,861,076 | B2 | 1/2018 | Rochelle et al. |
| 9,922,522 | B2 | 3/2018 | Solinsky et al. |
| 9,924,314 | B2 | 3/2018 | Solinsky et al. |
| 9,980,463 | B2 | 5/2018 | Milner et al. |
| 10,045,512 | B2 | 8/2018 | Mainini et al. |
| 10,151,843 | B2 | 12/2018 | McFarland et al. |
| 10,154,651 | B2 | 12/2018 | Goetzl et al. |
| 10,228,447 | B2 | 3/2019 | Rich et al. |
| 10,231,440 | B2 | 3/2019 | Seltzer et al. |
| D851,339 | S | 6/2019 | Vivathana |
| 10,356,585 | B2 | 7/2019 | Ling et al. |
| 10,444,374 | B2 | 10/2019 | Park et al. |
| 10,674,709 | B2 | 6/2020 | Goetzl et al. |
| 10,806,126 | B1 | 10/2020 | Loewke et al. |
| 10,842,129 | B1 | 11/2020 | Anderton et al. |
| 10,955,521 | B2 | 3/2021 | Seltzer |
| 10,986,813 | B2 | 4/2021 | Seltzer et al. |
| 11,013,214 | B2 | 5/2021 | Anderton et al. |
| 11,166,435 | B2 | 11/2021 | Anderton et al. |
| 11,470,814 | B2 | 10/2022 | Goetzl et al. |
| 11,553,692 | B2 | 1/2023 | Goetzl et al. |
| 11,647,733 | B2 * | 5/2023 | Marmen .............. A01K 27/001 |
| | | | 119/719 |
| 12,408,632 | B2 * | 9/2025 | De Samber .......... A01K 11/006 |
| 2005/0009376 | A1 | 1/2005 | Gotz et al. |
| 2005/0066912 | A1 | 3/2005 | Korbitz et al. |
| 2006/0197672 | A1 | 9/2006 | Talamas, Jr. et al. |
| 2006/0247847 | A1 | 11/2006 | Carter et al. |
| 2007/0204804 | A1 | 9/2007 | Swanson et al. |
| 2008/0035072 | A1 | 2/2008 | Lee |
| 2008/0036610 | A1 | 2/2008 | Hokuf et al. |
| 2008/0218357 | A1 * | 9/2008 | March ................... A01K 29/00 |
| | | | 340/870.11 |
| 2008/0272920 | A1 | 11/2008 | Brown |
| 2009/0309789 | A1 | 12/2009 | Verechtchiagine |
| 2010/0097208 | A1 | 4/2010 | Rosing et al. |
| 2010/0139576 | A1 | 6/2010 | Kim et al. |
| 2010/0161271 | A1 | 6/2010 | Shah et al. |
| 2011/0136086 | A1 * | 6/2011 | Saul ...................... G06Q 10/00 |
| | | | 434/236 |
| 2011/0140884 | A1 | 6/2011 | Santiago et al. |
| 2011/0298615 | A1 | 12/2011 | Rich et al. |
| 2012/0206454 | A1 | 8/2012 | Alasaarela |
| 2012/0209730 | A1 | 8/2012 | Garrett |
| 2013/0044025 | A1 | 2/2013 | Chiu |
| 2013/0127658 | A1 | 5/2013 | McFarland et al. |
| 2013/0157628 | A1 | 6/2013 | Kim et al. |
| 2013/0179204 | A1 | 7/2013 | Sabarez, II |
| 2013/0225282 | A1 | 8/2013 | Williams et al. |
| 2013/0271281 | A1 | 10/2013 | Jessop |
| 2013/0332064 | A1 | 12/2013 | Funk et al. |
| 2014/0002239 | A1 | 1/2014 | Rayner |
| 2014/0002307 | A1 | 1/2014 | Mole et al. |
| 2014/0012094 | A1 | 1/2014 | Das et al. |
| 2014/0048019 | A1 | 2/2014 | So |
| 2014/0116341 | A1 * | 5/2014 | Kopic .................... A01K 29/00 |
| | | | 119/14.02 |
| 2014/0261235 | A1 | 9/2014 | Rich et al. |
| 2014/0320347 | A1 | 10/2014 | Rochelle et al. |
| 2014/0335887 | A1 | 11/2014 | Liu et al. |
| 2014/0352632 | A1 | 12/2014 | McLaughlin |
| 2015/0065167 | A1 | 3/2015 | Scalisi |
| 2015/0073698 | A1 * | 3/2015 | Samuel ................. H04L 51/222 |
| | | | 701/422 |
| 2015/0107531 | A1 | 4/2015 | Golden |
| 2015/0181840 | A1 | 7/2015 | Tupin, Jr. et al. |
| 2015/0219767 | A1 | 8/2015 | Humphreys et al. |
| 2015/0269624 | A1 | 9/2015 | Cheng et al. |
| 2016/0007888 | A1 | 1/2016 | Nieminen et al. |
| 2016/0097861 | A1 | 4/2016 | Li et al. |
| 2016/0150362 | A1 | 5/2016 | Shaprio et al. |
| 2016/0178392 | A1 | 6/2016 | Goldfain |
| 2016/0259061 | A1 | 9/2016 | Carter |
| 2016/0278346 | A1 | 9/2016 | Golden |
| 2017/0006838 | A1 * | 1/2017 | Brayer .................... A01K 1/12 |
| 2017/0066464 | A1 | 3/2017 | Carter et al. |
| 2017/0265432 | A1 | 9/2017 | Anderton et al. |
| 2017/0347627 | A1 * | 12/2017 | Samuel ................ A01K 11/008 |
| 2017/0372580 | A1 | 12/2017 | Vivathana |
| 2019/0029221 | A1 | 1/2019 | Anderton et al. |
| 2020/0267941 | A1 | 8/2020 | Seltzer et al. |
| 2020/0375149 | A1 * | 12/2020 | Anderton ............. A01K 15/023 |
| 2022/0068142 | A1 | 3/2022 | Anderton |
| 2022/0125022 | A1 * | 4/2022 | Adams ................. H04L 67/025 |
| 2022/0236367 | A1 | 7/2022 | Seltzer et al. |
| 2022/0256812 | A1 | 8/2022 | Huber et al. |
| 2022/0257132 | A1 | 8/2022 | Huber et al. |
| 2022/0287577 | A1 | 9/2022 | Huber et al. |

(56) References Cited

U.S. PATENT DOCUMENTS

| | | | |
|---|---|---|---|
| 2023/0039951 A1 | 2/2023 | Seltzer et al. | |
| 2023/0240269 A1 | 8/2023 | Mainini et al. | |
| 2023/0301532 A1 | 9/2023 | Huber et al. | |
| 2025/0089679 A1* | 3/2025 | Ramey | A01K 15/025 |
| 2025/0089681 A1* | 3/2025 | Ma | A01K 15/029 |
| 2025/0386803 A1* | 12/2025 | Bruns | A01K 29/005 |

FOREIGN PATENT DOCUMENTS

| | | | |
|---|---|---|---|
| CN | 105393139 B | | 7/2019 |
| FR | 2869691 A1 | | 11/2005 |
| JP | 10260055 A | | 9/1998 |
| JP | 10295212 A | | 11/1998 |
| JP | 4787762 B2 | | 10/2011 |
| JP | 2015139667 A | | 8/2015 |
| JP | 2016139874 A | * | 8/2016 |
| KR | 102265654 B1 | | 6/2021 |
| WO | 1997024577 A3 | | 10/1997 |
| WO | 2000057692 A1 | | 10/2000 |
| WO | 2014151064 A1 | | 9/2014 |
| WO | 2014182420 A2 | | 11/2014 |
| WO | 2015173712 A1 | | 11/2015 |
| WO | 2016067116 A1 | | 5/2016 |

OTHER PUBLICATIONS

D. M. Anderson; Virtual Fencing—Past, Present and Future ("Anderson II"); The Rangeland Journal vol. 26, pp. 65-78.

Johnathan Chang, et. al.; Wireless Pet Containment ("Chang"); Rutgers University, Electrical and Computer Engineering Department, Capstone Design Projects, Team Project No. SP16-002; Feb. 22, 2016.

W. Randolph Franklin, PNPOLY—Point Inclusion in Polygon Test W. Randolph Franklin (WRF), May 18, 2005, https://web.archive.org/web/20050518083531/http://www.ecse.rpi.edu/Homepages/wrf/Research/Short_Notes/pnpoly.html ("Franklin").

Kai Hormann, et. al.; The Point in Polygon Problem for Arbitrary Polygons ("Hormann"); Computational Geometry, vol. 20 Issue 3; Nov. 2001.

Alejandro Weinstein; Distance from a Point to a Polygon ("Weinstein"); Matlab Central File Exchange; Apr. 1, 2008.

Donald H. House, Chapter 9—Raycasting Polygonal Models, Dec. 28, 2013, https://web.archive.org/web/20131228085233/http://people.cs.clemson.edu/~dhouse/courses/405/notes/raypolygon.pdf ("House").

Andrea Antonia Serra, et. al.; A Low-Profile Linearly Polarized 3D PIFA for Handheld GPS Terminals ("Serra"); IEEE Transactions on Antennas and Propagation, vol. 58, No. 4, pp. 1060-1066; Jan. 26, 2010.

Paul D Groves, et. al.; Context Detection, Categorization and Connectivity for Advanced Adaptive Integrated Navigation ("Groves"); Institute of Navigation GNSS+ 2013, Sep. 16-20, 2013, Nashville, TN, USA; Sep. 20, 2013.

Jeffrey David Miller; A Maximum Effort Control System for the Tracking and Control of a Guided Canine; A dissertation submitted to the Graduate Faculty of Auburn University in partial fulfillment of the requirements for the Degree of Doctor of Philosophy; Dec. 13, 2010; 216 pages.

Arun Vydhyanathan, et. al.; The Next Generation Xsens Motion Trackers for Industrial Applications ("Xsens"); 2015 Whitepaper published by Xsens regarding Motion Trackers (Version 2.0.1); 2015.

SiRF Technology Inc.; SiRF Demo UserGuide ("SiRF"); Mar. 2016.

Stefan Schirra; How Reliable are Practical Point-in-Polygon Strategies? ("Schirra"); 16th European Symposium on Elgorithms (ESA); 2008.

Collision Course II: Ray-Polygon-Intersection ("Claus"); Phys.ik. cx; Apr. 28, 2016.

LMU User's Guide ("LMU"); CalAmp DataCom Inc.; Dec. 2009.

Salvatore John Giunta; Garmin DC50 Dog Collar ("Garmin DC50"); 2013.

The Whistle GPS Pet Tracker & Activity Monitor ("Whistle"); Whistle Labs Inc.; 2015.

Tractive GPS Pet Tracker ("Tractive"); Tractive GmbH; 2013.

Tagg—The Pet Tracker ("Tagg"); Snaptracs Inc./Qualcomm Incorporated; 2011.

NoFence; Nofence AS; 2016.

Directional Virtual Fencing (DVF) Devices ("DVF"); United States Department of Agriculture Research / Massachusetts Institute of Technology; 2007.

Invisible Fence Brand GPS 2.0 ("Invisible Fence"); Invisible Fence, Inc.; 2015.

PeTrak Electric Fence ("PeTrak"); PeTrak, LLC; 2012.

Wolf-Tek Pet Collar ("Wof-Tek"); Wolf-Tek, LLC; 2015.

Mastrack Tracking System ("MasTrack"); MasTrack, LLC; 2015.

GPS Trackit ("GPS Trackit"); GPS Trackit, LLC; 2013.

Life 360 Family Safe Assist and Driver Protect ("Life360"); Life360 Inc.; May 25, 2016.

Geozilla Family Locator ("GeoZilla"); GeoZilla, Inc.; Apr. 2, 2016.

Fleetsat GPS Tracking Solutions ("Fleetsat"); Fleetsat Inc.; Jan. 3, 2015.

Trimble Aardvark DR + GPS ("Aardvark"); Trimble Navigation Limited; Jun. 29, 2012.

Round Solutions Nano Tracker Tracking Device ("NanoTracker"); Round Solutions GMBH & CO KG; Apr. 18, 2016.

Zack Butler, Peter Corke, Ron Peterson, Daniela Rus; Virtual Fences for Controlling Cows; Dartmouth College Department of Computer Science; CSIRO Manufacturing & Infrastructure Technology Brisbane; MIT Computer Science and Artificial Intelligence Laboratory; New Orleans, LA; Apr. 2004; 9 pages.

Yilmaz Kemal Yüce, et al.; An alternative approach to overcome ethical issues of geotracking patients with Alzheimer's disease; 7th International Symposium on Health Informatics and Bioinformatics; 2012.

Bogdan Târnaucă, et al.; Using Complex Event Processing for implementing a geofencing service; IEEE 11th International Symposium on Intelligent Systems and Informatics (SISY); Nov. 14, 2013.

Arun Vydhyanathan et al.; The Next Generation Xsens Motion Trackers for Industrial Applications; Xsens; 2015; 9 pages.

Berbakov et al.; Smart-Phone Application for Autonomous Indoor Positioning; Proceedings of the IEEE International Instrumentation and Measurement Technology Conference; May 14, 2015; pp. 670-374.

How to check if a given point lies inside or outside a polygon?—Geeks for Geeks, Jul. 11, 2013, https://web.archive.org/web/20130715200034/http://www.geeksforgeeks.org/how-to-check-if-a-given-point-lies-inside-a-polygon ("Geeks").

Vivek Shah, When is a Point Inside a Polygon?, May 17, 2013, https://web.archive.org/web/20130517010213/http://cgatglance.blogspot.com/ ("Shah").

Collision Course II: Ray-Polygon-Intersection, Apr. 28, 2016, https://web.archive.org/web/20161021075420/http://phys.ik.cx/ ("Claus").

A. Bahga and V. Madisetti, "Cloud-Based Information Technology Framework for Data Driven Intelligent Transportation Systems," Journal of Transportation Technologies, vol. 3 No. 2, 2013, pp. 131-141. doi: 10.4236/jtts.2013.32013.

Prasad, S., Weeks, M., Zhang, Y., Zelikovsky, A., Belkasim, S., Sunderraman, R., & Madisetti, V. (2002). Mobile Fleet Application using Soap and System on Devices (SYD) Middleware Technologies. Communications, Internet, and Information Technology.

Madisetti, Vijay, et al. (2004). SyD: A Middleware Testbed for Collaborative Applications over Small Heterogeneous Devices and Data Stores. 3231. 352-371. 10.1007/978-3-540-30229-2_19.

* cited by examiner

100

101

101

107

105

102

104

103

208

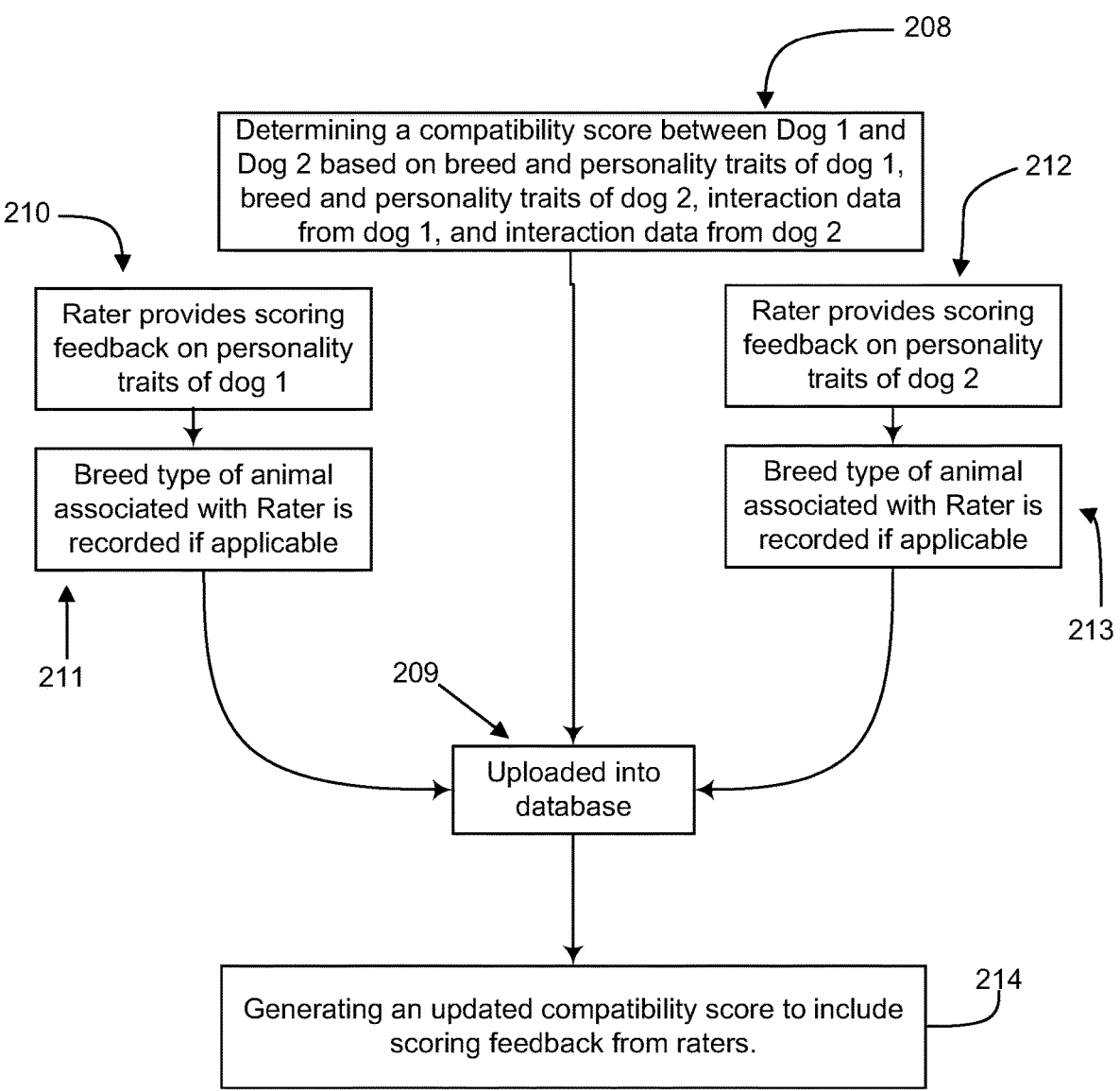

210

Determining a compatibility score between Dog 1 and Dog 2 based on breed and personality traits of dog 1, breed and personality traits of dog 2, interaction data from dog 1, and interaction data from dog 2

212

Rater provides scoring feedback on personality traits of dog 1

Rater provides scoring feedback on personality traits of dog 2

Breed type of animal associated with Rater is recorded if applicable

Breed type of animal associated with Rater is recorded if applicable

213

211

209

Uploaded into database

Generating an updated compatibility score to include scoring feedback from raters.

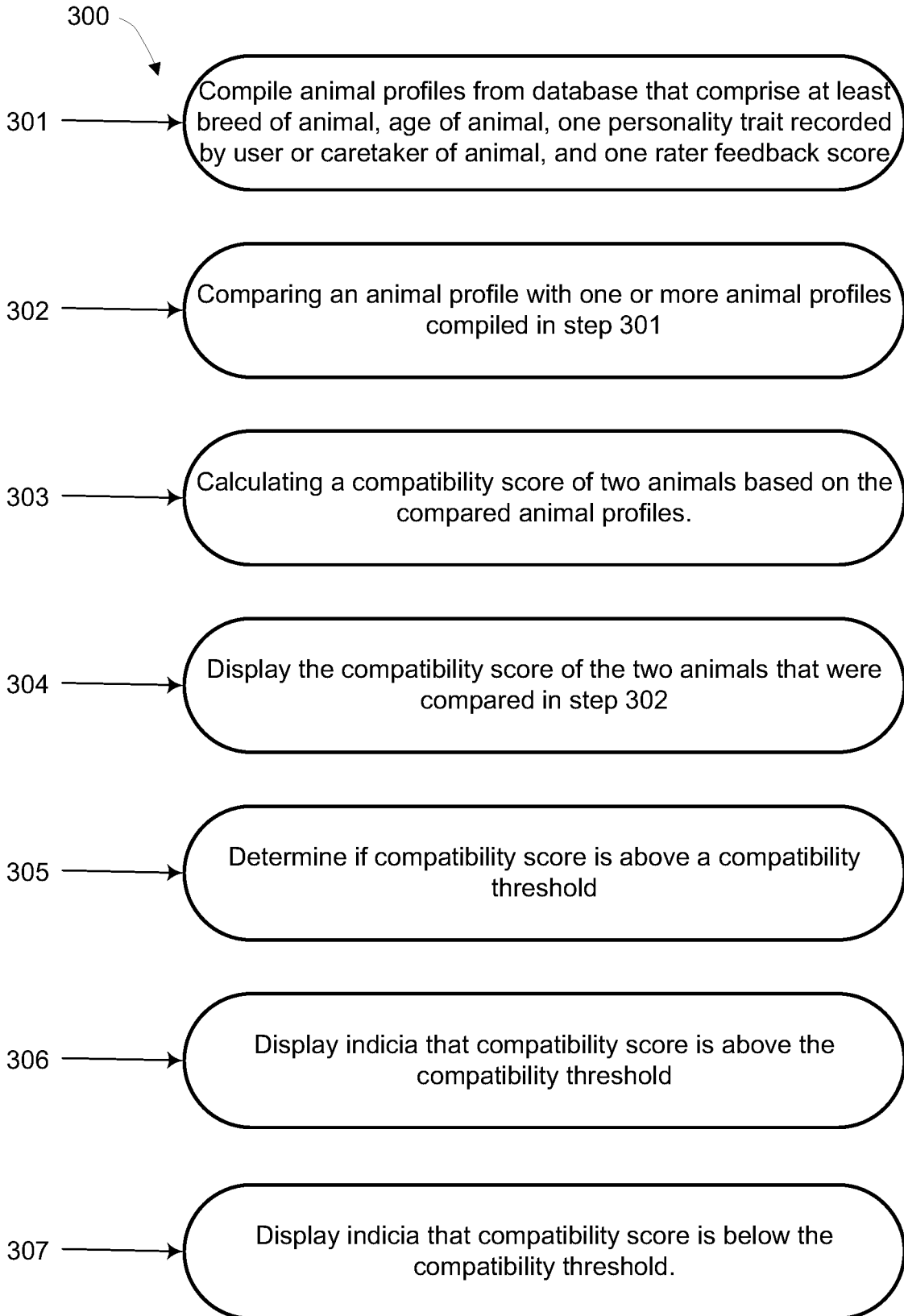

300

301 → Compile animal profiles from database that comprise at least breed of animal, age of animal, one personality trait recorded by user or caretaker of animal, and one rater feedback score 302 → Comparing an animal profile with one or more animal profiles compiled in step 301

303 → Calculating a compatibility score of two animals based on the compared animal profiles.

304 → Display the compatibility score of the two animals that were compared in step 302

305 → Determine if compatibility score is above a compatibility threshold

306 → Display indicia that compatibility score is above the compatibility threshold 307 → Display indicia that compatibility score is below the compatibility threshold.

FIG. 3

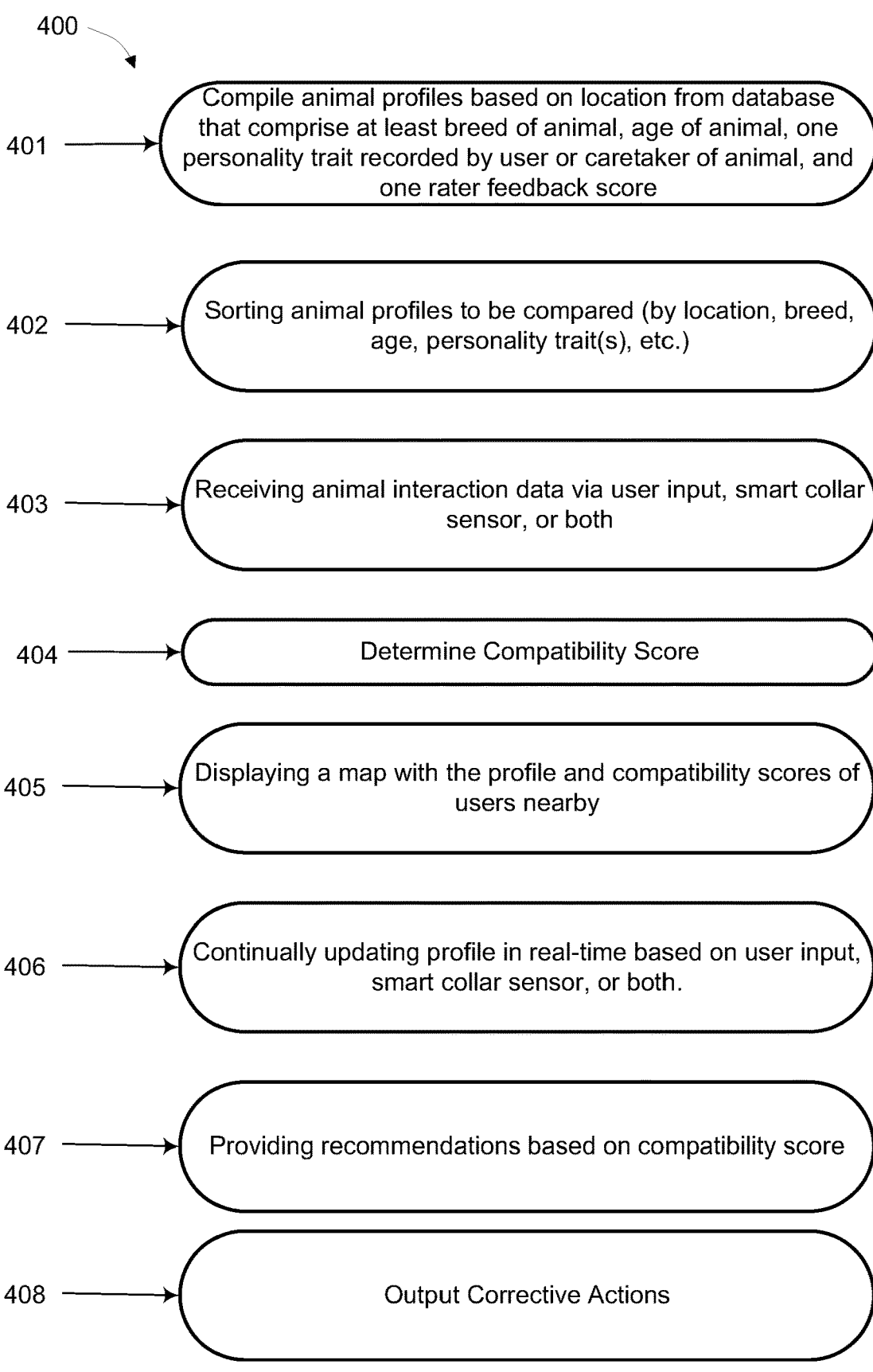

400

401 → Compile animal profiles based on location from database that comprise at least breed of animal, age of animal, one personality trait recorded by user or caretaker of animal, and one rater feedback score 402 → Sorting animal profiles to be compared (by location, breed, age, personality trait(s), etc.)

403 → Receiving animal interaction data via user input, smart collar sensor, or both 404 → Determine Compatibility Score 405 → Displaying a map with the profile and compatibility scores of users nearby 406 → Continually updating profile in real-time based on user input, smart collar sensor, or both.

407 → Providing recommendations based on compatibility score

408 → Output Corrective Actions

SYSTEM AND METHOD FOR DETERMINING AN ANIMAL COMPATIBILITY SCORE AND RECOMMENDATION

CROSS REFERENCE TO RELATED APPLICATIONS

This application claims the benefit of priority under 35 U.S.C. § 119 to prior filed U.S. Provisional Patent Application No. 63/421,640, filed Nov. 2, 2022, the entire contents of which is hereby incorporated by reference as if set forth in full herein.

FIELD OF THE INVENTION

The present invention relates generally to determining the compatibility of animals and providing recommendations for animals regarding those that may or may not get along.

BACKGROUND OF THE INVENTION

Pet ownership is growing and the ability to care for pets, as well as provide better healthcare and services has also grown. One area that this disclosure seeks to improve upon is the ability to find other pets to interact with an owner's pet(s) and preferably pets that would be a good fit or have a high compatibility for engaging in a positive manner.

There are approximately 340 known breeds of dogs throughout the world. In the American Kennel Club (AKC) database, they have provided a limited amount of generalized data with respect to individual breeds. For example, they provide information related to the particular breed's life expectancy, size, whether or not they are good with children or other dogs, activity level, shedding, etc. For example, if conducting a comparison based on breed, the AKC categorizes the Mastiff as dignified, good-natured, courageous, and good with children. However, according to the AKC, Mastiffs should be supervised around other dogs. In contrast, the AKC categorizes the American Foxhound as independent, easy-going, sweet-tempered, and good with children and other dogs.

Although personality types are not classified for specific cat breeds like they are with dogs, cats do have some of the same personality traits specific to each individual cat. Knowing whether a cat is compatible with another cat is useful when attempting to socialize cats or introduce new cats to the home environment.

Knowing how an animal will likely interact with another animal is useful and could even be essential with the rise in animal-friendly establishments and the use of dog parks. It is also helpful to know the compatibility of two animals for planning socialization activities.

Pet owners know their pet has individualized personality traits that are not always in line with the breed's generalized characteristics. Thus, there is a need to improve upon determining a more complete compatibility between individual animals.

The system and methods described herein seek to provide solutions to the above-stated problems, as well as provide other advantages that will become apparent to one skilled in the art.

SUMMARY OF THE INVENTION

Accordingly, it is desirable to have a system and method for determining animal compatibility of two animals comprising the steps of generating a first animal profile by a first user, wherein the animal profile includes at least type of breed information associated with the first animal and personality trait information associated with the first animal; generating a second animal profile by a second user, wherein the animal profile includes at least type of breed information associated with the second animal and personality trait information associated with the second animal; tracking, using a first smart collar, first animal interaction information based on an interaction with another animal that includes at least one of the following: heart rate of the animal, barking sounds, and movement of the animal; tracking, using a second smart collar, second animal interaction information based on an interaction with another animal that includes at least one of the following: heart rate of the animal, barking sounds, and movement of the animal; and generating a compatibility score between the first animal profile and the second animal profile based on breed type information, personality trait information, and animal interaction information associated with each of the first and second animal profiles.

In one such embodiment a method of determining animal compatibility of two animals further comprises the steps of receiving scoring feedback based on the personality trait information associated with the first animal profile from a first user rater that has interacted with the first animal either alone or with another animal; receiving scoring feedback based on the personality trait information associated with the second animal profile from a second user rater that has interacted with the second animal either alone or with another animal; recording the breed type of animal associated with the first user rater; recording the breed type of animal associated with the second user rater; and updating the compatibility score based on the scoring feedback of first user rater and scoring feedback from the second user rater.

In another embodiment, a method of determining the compatibility of two animals comprises the steps of comparing to an animal profile associated with a user's animal, one or more animal profiles from an animal profile database, wherein the animal profile associated with the user's animal and the animal profiles from the animal profile database comprise at least the following information: breed of animal, age of animal, at least one personality trait as recorded by the owner or caretaker of the animal, and at least one rating of the at least one personality trait from another user having interacted with the animal from which the animal profile is based on; and determining and displaying a compatibility score based on the compared animal profile information; and determining if the compatibility score is above a compatibility threshold.

In one such embodiment a method of determining animal compatibility of two animals further comprises the step of each animal profile being configured to receive real-time updating information from a mobile device associated with the owner or caretaker that is running an application configured to function as a portal to receive both user input and sensor derived information. In one embodiment, the sensor derived information is captured using a smart collar. In an alternate embodiment, the sensor derived information is captured using sensors associated with the mobile device.

In the above method the first and second smart collar include at least one of the following sensors: accelerometer, a heart sensor, microphone, gyroscope, and magnetometer.

In yet another embodiment, the method of determining the compatibility of two animals further comprises the steps of sorting the animal profiles to be compared by location, wherein the location is automatically determined based on the current location of user; and displaying on a map a location of available nearby owners or caretakers of animals of associated animal profiles and their compatibility score.

In an alternate embodiment, the method of determining the compatibility of two animals further comprises the steps of automatically receiving animal interaction data as part of the captured sensor derived data; and updating the compatibility score based on the received animal interaction data.

In yet another embodiment, the method of determining the compatibility of two animals further comprises the steps of receiving animal interaction data as part of the user input information; and updating the compatibility score based on the received animal interaction data.

The disclosed technology can include a method of determining a compatibility of two animals, the method comprising receiving first data corresponding to a first animal, receiving second data corresponding to a second animal, and determining a compatibility score based at least in part on the first data and the second data. The compatibility score can be indicative of a likelihood that the first animal and the second animal will be compatible.

The method can further include receiving first position data from a first smart collar worn by the first animal, receiving second position data from a second smart collar worn by the second animal, and determining, based on the first position data and the second position data, whether the first animal is within a threshold distance from the second animal.

The determining the compatibility score can be done in response to determining the first animal is within the threshold distance from the second animal.

The method can further include determining whether the compatibility score is greater than or equal to a threshold compatibility score and, in response to determining that the compatibility score is less than a threshold compatibility score, outputting a notification to a user device indicative of the first animal and the second animal likely being incompatible.

The method can include determining whether the compatibility score is greater than or equal to a threshold compatibility score and, in response to determining that the compatibility score is less than a threshold compatibility score, causing the first smart collar and the second smart collar to activate a keep-away mode.

The keep-away mode can be configured to cause the first smart collar and the second smart collar to output a corrective action to cause the first animal and the second animal to separate from each other.

The threshold distance can be a first threshold distance and the method can further include determining whether the first animal and the second animal are within a second threshold distance from each other. The second threshold distance can be less than the first threshold distance. In response to determining that the first animal and the second animal are within the second threshold distance from each other, the method can include outputting the corrective action to cause the first animal and the second animal to separate from each other.

The first data can be received from a first user device and the second data is received from a second user device. The first data can comprise at least a type of breed of the first animal and the second data comprises at least a type of breed of the second animal or personality data corresponding to a personality of the first animal and a personality of the second animal.

The method can include receiving first sensor data from a first smart collar worn by the first animal and receiving second sensor data from a second smart collar worn by the second animal. The determining the compatibility score can be based on the first data, the second data, the first sensor data, and the second sensor data.

The determining the compatibility score can comprise assigning a first value to the first data and the second data and assigning a second value to the first sensor data and the second sensor data, with the second value being greater than the first value.

The first data can be based at least in part on data received from a first smart collar worn by the first animal. The second data can be based at least in part on data received from a second smart collar worn by the second animal. The data received from the first smart collar can include at least one of movement data, sound data, and biometric data.

The first smart collar and the second smart collar are each configured to determine whether the first smart collar and the second smart collar are within a threshold distance from reach other and, in response to determining that the first smart collar and the second smart collar are within the threshold distance from each other, record movement data.

The disclosed technology can include a smart collar comprising a strap configured to be worn by an animal, a power source, memory storing instructions, a processor in communication with the memory, a communication interface configured to transmit and receive data, a motion sensor configured to detect a motion of the animal, and a geolocation sensor in communication with the processor.

The smart collar can be configured to receive geolocation data indicative of a location of the animal, receive data indicative of the animal being near a second animal, and, in response to determining that the animal is near the second animal, record motion data via the motion sensor. The motion data can be indicative of behavior of the animal while near the second animal.

The smart collar can further comprise a microphone and the smart collar can be further configured to record sound data in response to determining that the animal is near the second animal. The smart collar can further comprise a biometric sensor. The smart collar can be further configured to record biometric data in response to determining that the animal is near the second animal.

The smart collar can be further configured to receive data indicative of the animal being incompatible with the second animal and activate a keep-away mode. The keep-away mode can comprise determining whether the animal is within a threshold distance from the second animal and, in response to determining that the animal is within the threshold distance from the second animal, outputting one or more corrective actions to cause the animal to move away from the second animal.

The smart collar can be further configured to output a signal to a second smart collar worn by the second animal to cause the second smart collar to activate a keep-away mode.

Other variations and configurations will become evident in the detailed description below.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 2A and 2B illustrate an exemplary method for determining an animal compatibility score.

FIG. 3 illustrates an alternate method for determining an animal compatibility score.

FIG. 4 illustrates an exemplary method for determining an animal compatibility score and recommendation.

DETAILED DESCRIPTION OF THE INVENTION

Figure 1:
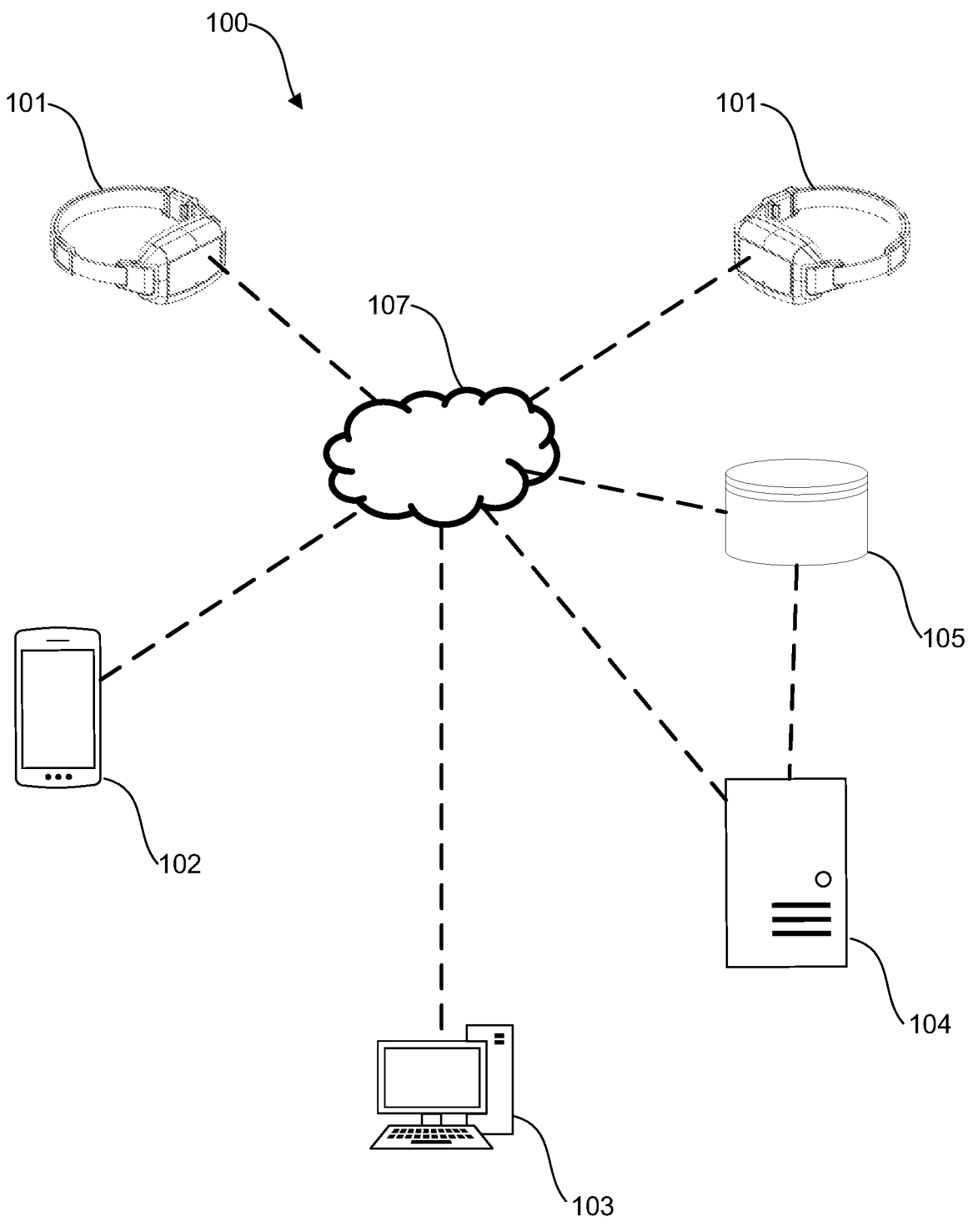
FIG. 1 illustrates a schematic of the system for determining an animal compatibility score and recommendation.

This application describes a system and method for determining a compatibility score between two animals and making recommendations based on that score. Part of the compatibility system is to recommend that certain animals meet because they are well suited for each other and should get along well based on their compatibility score. In addition, animals that are below a compatibility threshold score should not be in the same location because they may be more likely to show signs of aggression, or other unwanted behavior, towards each other. The disclosed technology includes methods of helping to prevent two or more animals that are incompatible with each other from coming near each other. These methods include outputting a notification to a user device and activating a keep-away mode to keep the animals away from each other. The keep-away mode can cause the collar to output one or more corrective actions cause the animals to stay away from each other.

Several factors are considered when generating a compatibility score, including user inputs and sensor derived data. User input comprises of breed, personality trait(s) of animal, scoring feedback of personality trait(s), etc. Sensor derived data comprises of interaction data downloaded from a smart collar or a user portal.

The disclosed technology will be described more fully hereinafter with reference to the accompanying drawings. This disclosed technology can, however, be embodied in many different forms and should not be construed as limited to the examples set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

Unless otherwise specified, the use of the ordinal adjectives "first," "second," "third," etc., to describe a common object, merely indicate that different instances of like objects are being referred to and are not intended to imply that the objects so described should be in a given sequence, either temporally, spatially, in ranking, or in any other manner.

As used herein, the terms "correction" and "corrective action" are used interchangeably and can include an electronic stimulus, a spray of liquid, a light, a vibration, an audible warning or pre-recorded voice command, etc. Various aspects and functionalities of the disclosed technology are discussed more fully below.

FIG. 1 illustrates a schematic of the system 100 for determining an animal compatibility score and recommendation that is configured to collect information from smart collar 101 and personal computing device 102 and communicate (wired or wirelessly) with a networked computing device 103. The personal computing device 102 and the networked computing device can each be a smartphone, a laptop computer, a smartwatch, a tablet, etc. The networked computing device 103 is configured to communicate via a network to a remote server 104 and a remote database 105. The remote server 104 can be used to supplement or perform any comparisons of data. The database 105 can be an internal database, a remote database or a 3rd party database (s) which has data signal information for global positioning system (GPS), Cellular and/or public Wi-Fi hotspots.

Each animal profile is configured to receive real-time updated information from a personal computing device 102 associated with the owner or caretaker that is running an application configured to function as a portal to receive both user input and sensor derived information. The sensor derived information can be obtained from a smart collar 101, a personal computing device 102, or a combination thereof. In some examples, the collar 101 can be configured to transmit the sensor derived information directly to the networked computing device 103, the remote server 104 and/or the remote database 105.

The smart collar 101 has at least one of the following sensors: an accelerometer, a biometric sensor (e.g., an optical heart sensor, an electrode-based heart sensor, a thermometer, etc.), a microphone, a gyroscope, and a magnetometer. The interaction algorithm uses this data to calculate the type of interaction between the two animals. The sensor derived data can also be captured using sensors associated with a mobile device (e.g., a microphone, a camera, an accelerometer, gyroscope, magnetometer, etc.).

A historical database of different interaction encounters can be updated periodically as interactions are appropriately detected. This information can be further used to fine tune the animal interaction detection algorithm. In order to detect and measure the interactions between two animals, an interaction detection algorithm has been developed to measure signal from each smart collar 101 or sensor derived device through various sensors. The signals from each of the sensors are analyzed to determine pet behavior or movement. For example, the smart collars 101 can determine, using GPS data and magnetometer data (e.g., from a GPS sensor and magnetometer on the smart collar 101), that two or more animals wearing the smart collars 101 are near each other and facing toward each other which would indicate that the animals wearing the smart collar 101 are likely interacting with each other. Alternatively, or in addition, the smart collar 101 can determine that the animal wearing the smart collar 101 is interacting with another animal based on sound data received from a microphone and movement data received from an accelerometer on the smart collar 101.

In one embodiment, the interaction detection mode includes recognizing the presence of a second smart collar 101 and begins recording interaction information from the two animals. For example, a first smart collar 101 can be configured to receive a signal from a second smart collar 101 (and vice-versa) to determine that the first and second smart collars 101 are near each other. To illustrate further, the first and second smart collars 101 can each be configured to output and to receive a Bluetooth, Bluetooth Low Energy (BLE), Wi-Fi, or other wireless signal a predetermined distance such that when the first and second smart collars 101 are within range of each other, they first and second smart collars 101 can detect the presence of each other. Alternatively, the system 100 can be configured to determine that two animals wearing a smart collar 101 are near each other based on geo-positioning data received via a GPS system. For example, by knowing a position of a first smart collar 101 and a second smart collar 101, determining a distance between the two smart collars 101, and then determining if the smart collars 101 are within a threshold distance from each other, the system 100 can be used to determine that the animals are near each other and likely interacting with each other. The interaction information can include signals from an audio sensor (a microphone to detect when at least one dog barks, growls, etc.), an accelerometer (to detect movement of the dogs when near each other), a magnetometer (to detect a direction in which the dog is facing—for example, facing toward or away from the other dog), or any combination thereof. Also, the recorded signals can be used to update the interaction detection algorithm. In one embodiment, the interaction detection algorithm may be manually turned on or off by the user by using a mobile device (e.g., personal computing device 102) in communication with the smart collar 101.

In an alternative embodiment, the interaction analysis mode includes comparing the real-time interaction detection information between two animals with the historical interaction database to analyze the type of encounter the two dogs are having. For example, if a dog generally growls prior to becoming aggressive with another dog, the smart collar 101 can determine that a subsequent growl during a different interaction may indicate that the dog may become aggressive or is becoming aggressive in a present interaction.

The interaction detection system also includes an algorithm training mode. In this mode, the collar 101 and the various sensors detect input while the pet is playing with a known animal that the pet already gets along with. For example, a user who has two dogs who are friendly with each other. The user enters the system into a training mode, and as the dogs play with each other, the sensor data is collected and analyzed. This collected and analyzed data is used to update and fine tune the interaction detection algorithm.

In accordance with these concepts, the system 100 as contemplated can include a collar 101, as shown in FIG. 1 which is configured to be affixed to a pet. The system 100 can be provided with a user portal or web app which can present an interactive map to the user (see FIG. 6). It will also be understood that the user portal can be presented to the user or interacted with by the user via an application on a personal computing device 102 or using an online web portal (see FIG. 7).

As discussed in some detail above, the system 100 will include a user portal or platform, such as an application, which can be configured to receive input from a user. It will be understood that the application/user portal can be accessed through mobile devices (e.g., the smart phone such as personal computing device 102), web portals, or any number of suitable means. The portal can be used to define and display at least one area where animals congregate, like a dog park. For example, a user can view a map on their personal computing device via the portal that illustrates, on a map, boundaries of a dog park or a particular area. The portal can be further configured to display the location of a particular animal wearing the smart collar 101, the location of other animals wearing a smart collar 101, and other features nearby.

Additionally, it will be understood that the smart collar 101 can be provided with a local processing unit and non-transitory computer-readable media for tracking location or activities and saving data with regard to those activities locally. Such a local processor and non-transitory computer-readable media can store computer instructions wherein the interaction data and user rater steps when applied can each be determined locally and performed locally after transfer of such instructions from the user portal. Accordingly, the user portal can be connected to a remote server 104 having a remote processor and non-transitory computer-readable media can be utilized remotely, and instructions can then be transmitted to the smart collar 101 to perform any such step or action using a mobile or home network.

The system 100 can also include processing capabilities and data storage capabilities which allow for activities to be determined, stored, and enter a desired mode based on a predetermined set of instructions in response to input or commands from the various sensor or commands provided through the communication systems. In some instances, pet data can be transmitted and stored over an external network or service for data tracking of various pet activities, parameters, etc.

The mobile application, which can be specifically designed to connect to the smart collar 101 using Bluetooth technology on a smart device (e.g., personal computing device 102), can allow for control of the smart collar 101 itself in real-time. For example, a user connected mode can allow the user to refine the data from the smart collar 101 that is being used to interpret an interaction. In addition, a user can manually record an interaction between two animals where the data was unable to be generated automatically. For example, if one dog has a smart collar 101, but the second dog does not, the user can provide an input via the personal computing device 102 to indicate that data recorded during a specified time is indicative of the dog wearing the smart collar 101 interacting with another dog (who may not be wearing a smart collar 101).

Figure 2A:
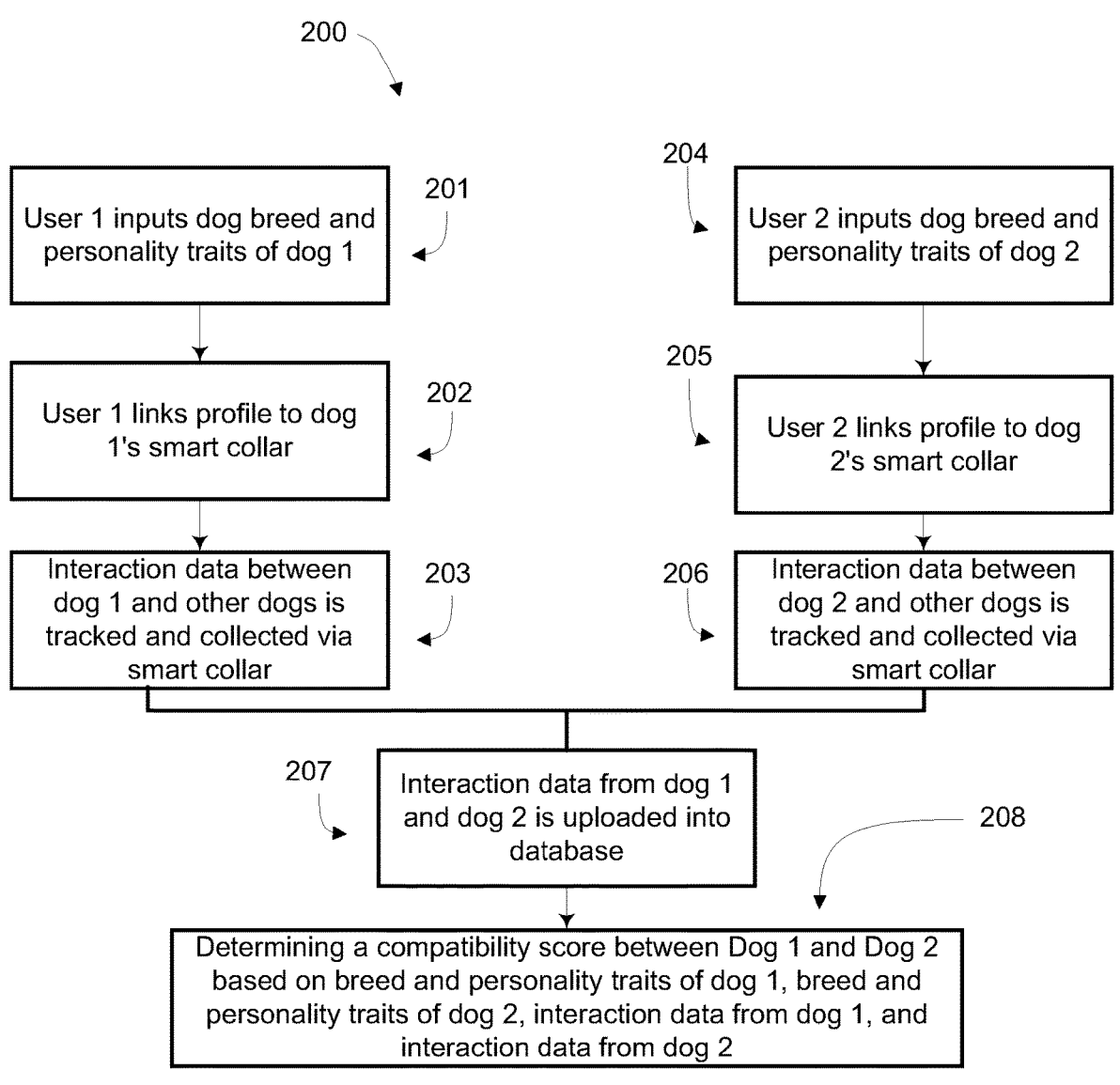

FIG. 2 illustrates an exemplary method for determining an animal compatibility score. Step 201 comprises of User 1 entering the breed and personality traits of dog 1 into their profile. Examples of animal personality traits include affectionate, aggressive, dominant, excitable, relaxed, and vocal, to name a few. Based on the animal's personality traits, dog 1 will be given a temperament guide of green, yellow, or red (see FIG. 5). Step 202 comprises of User 1 linking the profile to dog 1's smart collar 101. Step 203 comprises of collecting interaction data between dog 1 and other dogs via smart collar 101. Step 204 comprises of User 2 entering the breed and personality traits of dog 2 into dog 2's profile. Step 205 comprises of User 2 linking dog 2's profile to dog 2's smart collar 101. Step 206 comprises of collecting interaction information between dog 2 and other dogs via a smart collar 101.

Step 207 comprises of uploading interaction information from the smart collar 101 worn by dog 1 and the smart collar 101 worn by dog 2. Step 208 comprises of calculating a compatibility score, using an algorithm, based on breed and personality trait(s) of dog 1, breed and personality trait(s) of dog 2, interaction data collected from dog 1, and interaction data collected from dog 2. Step 209 comprises of uploading the compatibility score to the database 105. Once the compatibility score is calculated, it can be used to recommend a match between dog 1 and dog 2 (e.g., dog 1 and dog 2 are likely compatible) or warn users of a problematic match (e.g., dog 1 and dog 2 are likely incompatible).

In an exemplary embodiment, each animal profile is configured to receive real-time updating information from a mobile device (e.g., personal computing device 102) associated with the owner or caretaker that is running an application configured to function as a portal to receive both user input and sensor derived information. The compatibility score continually updates based on the real-time updates along with other various factors.

As shown in FIG. 2B, a user rater can provide feedback on the personality traits of a particular animal. A user rater, for example, is not the same as the owner or caretaker of the dog for whom the rater is providing feedback. In this way, the disclosed technology can help prevent inaccurate information from being submitted by a caretaker or owner of a particular dog (e.g., a caretaker or owner who thinks his or her dog is friendly with other dogs when in fact it is not). Step 210 comprises of a user rater providing scoring feedback for dog 1. For example, using the portal, the user rater can select dog 1 and input interaction information about dog 1 (dog 1 was aggressive, etc.). As a non-limiting example, the portal can be configured to display a map of nearby dogs and the user rater can select dog 1 on the map and input scoring feedback about dog 1.

Step 211 comprises of recording the breed type of animal associated with the user rater from step 210. For example, the user rater can input information about his or her dog, including the breed type of user rater's animal that interacted with dog 1. Step 212 comprises of a user rater providing scoring feedback for dog 2. As before, the user rater can be different than the care taker or owner of dog 2. Step 213 comprises of recording the breed type of animal associated with the user rater from step 212. Both scoring feedback and breed types associated with the user rater are uploaded into database (e.g., database 105). Step 214 comprises of updating the compatibility score using an algorithm to include the scoring feedback from user raters.

In other words, the example shown and described in relation to FIG. 2B can include other users inputting data into the database 105 that provides additional data points on the personality and behavior of a particular animal (e.g., dog 1, dog 2, etc.). In this way, the disclosed technology can further refine the recommendation algorithm based on feedback from other users who may not be as biased as a caretaker or owner of a particular dog.

In some examples, the disclosed technology can be configured to assign individual weights to certain data in order to generate the compatibility score. For example, data input by a user can be given a greater weight than data generated by sensors on the smart collar 101. For example, if the user indicates that the animal wearing the smart collar 101 gets along well with other animals, the data input by the user can be given a greater weight than data received from the sensors that might indicate that the animal wearing the smart collar 101 is acting aggressively. This can be particularly useful, for example, when a dog generally likes to play with other dogs and may bark or growl but is not aggressive with other animals.

Over time, however, the weight assigned to data input by the user may be lessened based on data received from the sensors on the smart collar 101 or data received from other user raters. For example, if a user rates his or her animal as having a mild temperament and playing well with other animals, but sensor data and/or other user rater data indicates that the animal is aggressive or generally does not get along well with other animals, the weight assigned to the data received from sensors on the smart collar 101 and/or data received from the other user raters will be given a greater weight to more accurately determine whether the animal will be compatible with other animals.

FIG. 3 illustrates an alternate method 300 for determining an animal compatibility score. Step 301 comprises of compiling animal profiles from database 105 that can comprise at least breed of animal, age of animal, one personality trait recorded by user or caretaker of animal, and one user rater feedback score. Step 302 comprises of comparing an animal profile with one or more animal profiles compiled in step 301. Step 303 comprises of calculating a compatibility score of two animals based on the compared animal profiles. Step 304 comprises of displaying the compatibility score of the two animals that were compared in step 302. Step 305 comprises of determining if the compatibility score is above a compatibility threshold. Step 306 comprises of displaying a check mark, or other visual cue, next to the displayed compatibility score if the score is above a compatibility threshold. Step 307 comprises of displaying an "X," or other visual cue, next to the compatibility score if the score is below a compatibility threshold. The user, for example, can view the visual cues indicative of compatibility or incompatibility on the display of his or her personal computing device 102, for example, using the portal. In this way, a user can quickly determine which animals nearby might be compatible with his or her animal and which ones may not be compatible.

FIG. 4 illustrates an exemplary method 400 for determining an animal compatibility score and recommendation. Step 401 comprises of compiling animal profiles from database 105 that comprise at least breed of animal, age of animal, one personality trait recorded by user or caretaker of animal, and one user rater feedback score. Step 402 comprises of sorting the animal profiles to be compared by location. In an alternate embodiment, the profiles are sorted by breed. In yet another embodiment, the profiles are sorted by temperament guide.

Step 403 comprises of receiving animal interaction data via user input, smart collar sensor, or a combination thereof. Step 404 comprises of determining a compatibility score. Step 405 comprises of displaying a map with the profile picture and compatibility score of users and pets nearby. Step 406 comprises of continually updating animal profiles in real-time based on user input, smart collar sensors, or a combination thereof. Step 407 comprises of providing recommendations to users based on their animal's calculated compatibility score with other animals in their area. For example, the step 407 can include outputting recommendations as to whether to allow an animal to interact with another animal based on a calculated compatibility score between the two animals.

The method 400 can further include outputting 408 one or more corrective actions (e.g., activating a keep-away mode)

if it is determined that the animal wearing the smart collar 101 is not compatible with another animal wearing a second smart collar 101. The corrective actions, for example, can be an electronic stimulus, a spray of liquid, a light, a vibration, an audible warning or pre-recorded voice command, etc. The corrective actions can be configured to discourage the incompatible animals wearing the smart collars 101 from coming near each other. The disclosed technology, for example, can be configured to transition the smart collar 101 to the keep-away mode, or operate in keep-away mode concurrent with other modes, which can cause the smart collar 101 to provide one or more corrections when the smart collar 101 is moved to within a predetermined distance from the incompatible animal. As a nonlimiting example, such functionality may be desirable in cases in which a dog is at a dog park and allowed to freely roam near other animals at the dog park. The disclosed technology can be configured to discourage the dog from coming near other animals that have been determined to be incompatible with the dog.

The disclosed technology can be further configured to cause the smart collar 101 worn by the other incompatible animal to also activate a keep-away mode. In this way, both smart collars 101 can activate the keep-away mode and work together to ensure the animals wearing the smart collars 101 do not come near each other. The smart collars 101, for example, can each be configured to output corrective actions whenever one dog comes within a predetermined distance of the other dog to cause both dogs to move away from each other. The smart collars 101 can be configured to determine a distance between each other based on a signal strength received from each other. For example, each collar can output a wireless signal and the receiving smart collar 101 can determine a distance from the transmitting smart collar 101 based on the detected signal strength. Once the signal strength exceeds a predetermined signal strength threshold, the smart collar 101 can output a corrective action to cause the animal wearing the receiving smart collar 101 to move away from the animal wearing the transmitting smart collar 101. The receiving smart collar 101 can be further configured to output a signal to the transmitting smart collar 101 (i.e., the receiving smart collar 101 can become the transmitting smart collar 101, and vice-versa) to cause the transmitting smart collar 101 to output a corrective action to cause the animal wearing the transmitting smart collar 101 to move away from the animal wearing the receiving smart collar 101.

As another example, the smart collars 101 can be configured to determine a distance between the smart collars 101 based on a position as determined by GPS signals. If the smart collar 101 determines that it is within a predetermined distance from a smart collar 101 worn by an incompatible animal, the smart collar 101 can output a corrective action to discourage the animal wearing the smart collar from approaching the other animal. Similarly, the smart collar 101 can output a signal to the other smart collar 101 to cause both smart collars 101 to output corrective actions to cause the incompatible animals wearing the smart collars to move away from each other.

The disclosed technology can be further configured to allow a user to activate and disable the keep-away mode as desired. For example, the smart collar 101 can be configured by default to activate the keep-away mode when the smart collar 101 is determined to be near another animal that is determined to be incompatible. If, however, the user determines that he or she would like the two animals wearing the smart collars 101 to come near each other, the user can select an option (e.g., on his or her personal computing device 102)

to deactivate the keep-away mode. This can be useful, for example, if you have two animals that are determined to be incompatible but the caretakers want the animals to become socialized and learn to behave well around each other.

In some example, the disclosed technology can be configured to initiate a compatibility determination when a first smart collar 101 and a second smart collar 101 are within a first threshold distance from each other. For instance, if a first smart collar 101 is brought within 100 feet of a second smart collar 101, the disclosed technology can initiate the compatibility determination. The disclosed technology can be further configured to output corrective actions in the keep-away mode only when the first smart collar 101 and the second smart collar 101 are brought within a second threshold distance from each other. The second threshold distance can be less than the first threshold distance. For example, you may not want dogs who are incompatible with each other to be allowed to come within ten feet of each other. In this way, the compatibility determination can be made well before the two animals are able to come near each other and the keep-away mode can be activated and ready to output corrective actions before the two animals are within a dangerous distance from each other.

Figure 5:
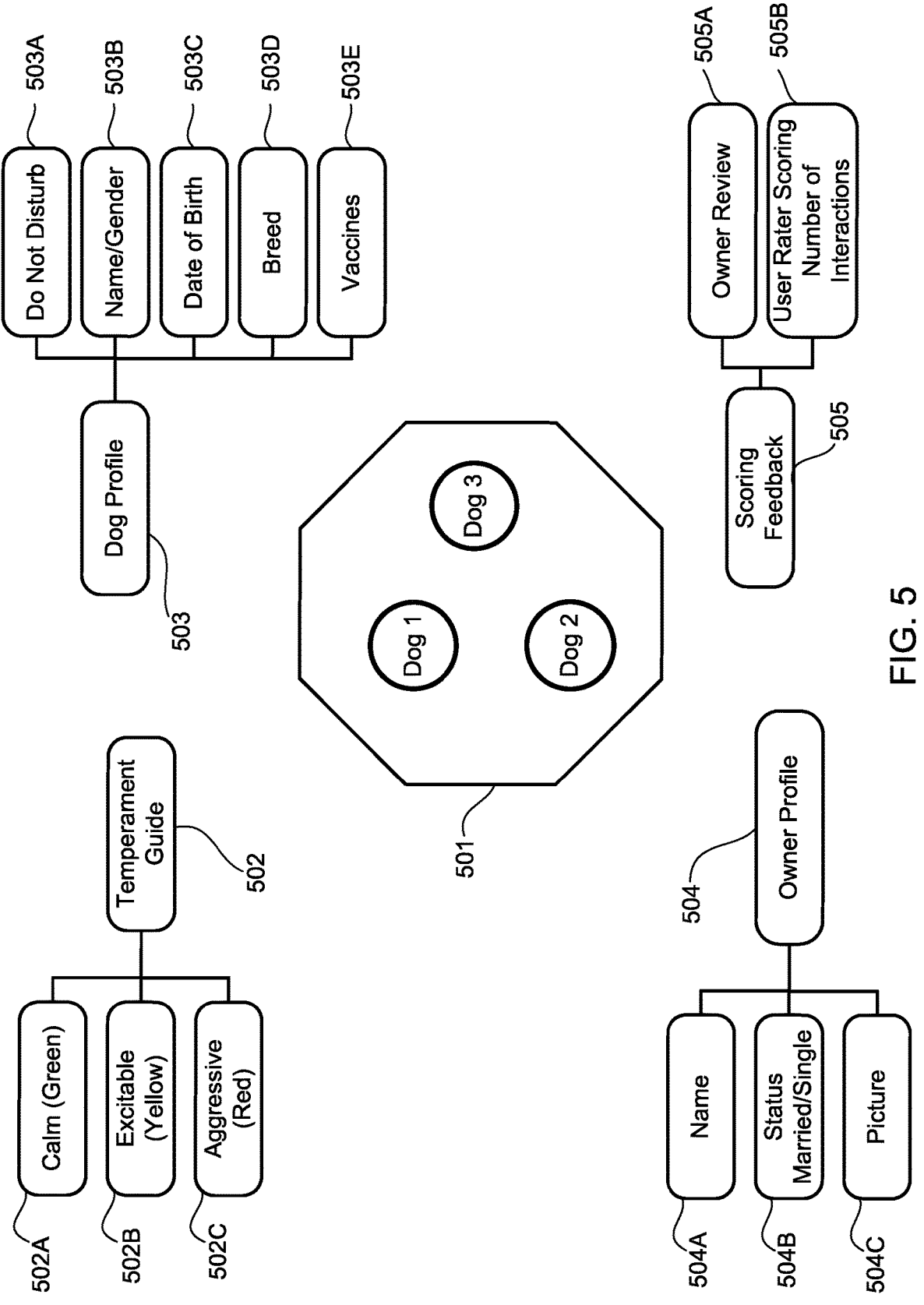
FIG. 5 illustrates an exemplary diagram of the available options via a user portal.

FIG. 5 illustrates an exemplary diagram of available options via a user portal. The user portal can be accessed via a personal computing device 102 or networked computing device 103 (see FIG. 1). User can add, view, or edit his or her animal's profile 503, view his or her animal's temperament guide 502, update his or her owner profile 504, and rank his or her animal or another's under scoring feedback 505. The geofenced area 501 relates to a physical location, like a dog park, where a user can view which animals are already in the area 501 prior to their arrival. In addition, while they are in the geofenced area 501, user can provide scoring feedback of the animals in the area 501 via the scoring feedback screen 505. This scoring feedback is added to the database to recalculate the compatibility score of that animal in relation to other animals.

As will be appreciated, there can be myriad reasons why you would want to keep one animal away from another animal and the disclosed technology can be configured to factor in many reasons, other than just behavior or temperament, to determine a compatibility. A user can provide data associated with a particular to the database that can be used to determine a compatibility between animals. For example, a user can input health information (vaccine information, the animal is sick, whether the animal is spayed or neutered, etc.) that can be used to determine whether the animal wearing the smart collar 101 would be compatible with another animal. As another example, the user may not want his or her animal from coming near other animals because he or she does not want to socialize the caretaker or owner of the other animal. Potentially, the user needs to take his or her animal for a walk but has been ill and does not want to socialize with other people walking their dogs too. The user can change the animal's status on the portal as not wanting to socialize and the dog wearing the smart collar 101 will appear as not being compatible or at least not available for visits from other animals.

Figure 6:
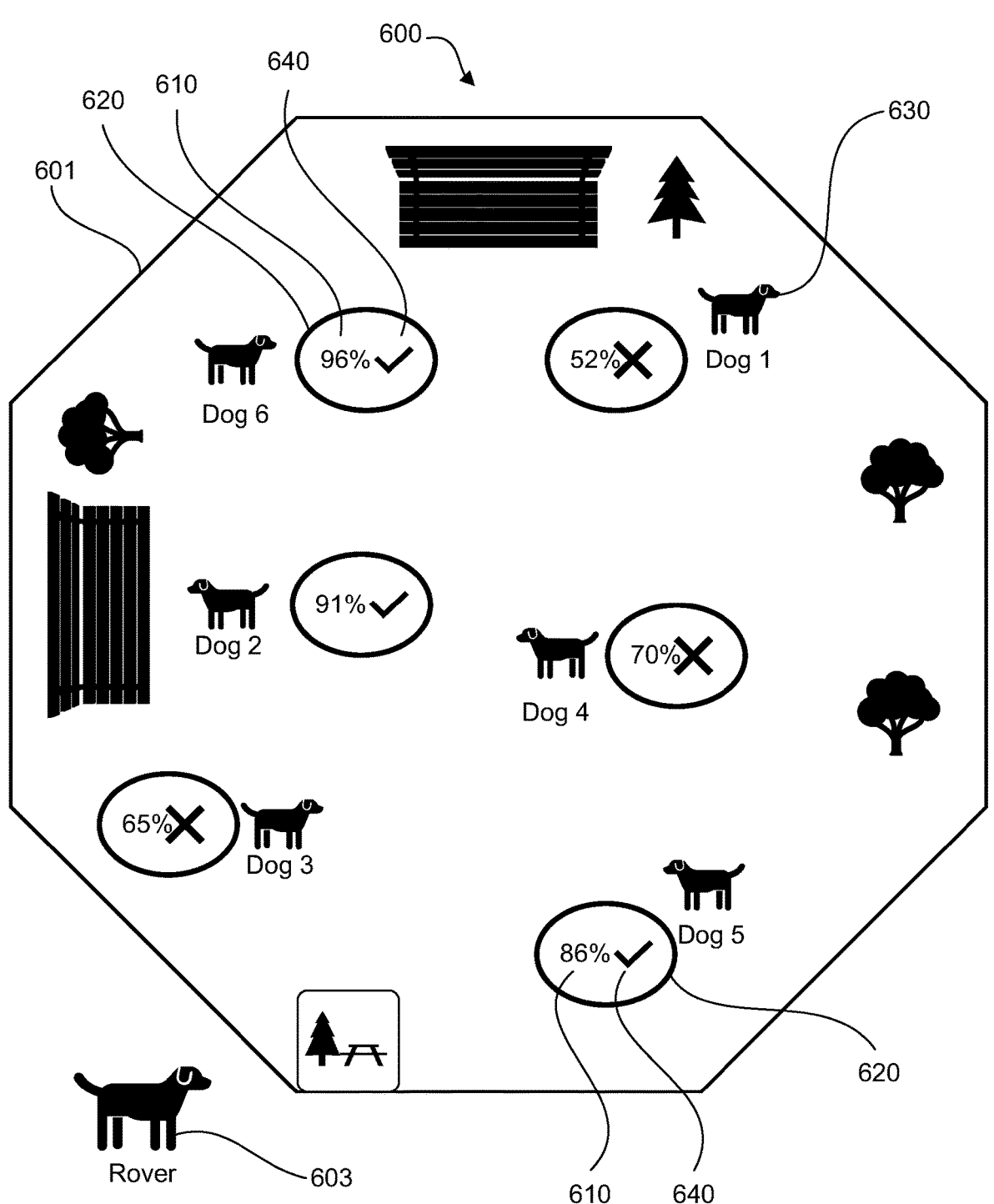
FIG. 6 illustrates an exemplary view of the map via a user portal.

FIG. 6 illustrates an exemplary view of the map 600 via a user portal. The map view depicted here is of a dog park, however, this display is based on the user's location. For example, if the user is simply walking along a trail or a road, the map can be based on the user's current location. In this figure, Rover 603 is the user's dog, and the map view is based on Rover's 603 compiled data. In this exemplary embodiment, user can view the map 600 of geofenced area

601 which shows the dogs currently in the area 601 and the compatibility score for each dog in the area 601 in relation to Rover 603. In this view, dogs are displayed with their profile picture 630, along with their name, a compatibility score 610, threshold indicia 640 and a temperament guide 620. The temperature guide, for example, can be color coded (green, yellow, red, etc.) as previously described. The compatibility scores represented here are specific to Rover, i.e., the compatibility score 610 between Rover and Dog 2 is 91%. However, the compatibility score 610 between Dog 2 and Dog 5 would be displayed on the user portal for the owner of each of those animals.

There is also a secondary indication of an "X" or check mark that will signal to user that the dog is above or below a specific compatibility score threshold. A check mark represents that the dog is above the compatibility score threshold. An "X" represents that the dog is below the compatibility score threshold. For example, Rover appears to be compatible with Dog 2, Dog 5, and Dog 6, as indicated by the percentage compatibility scores of 91%, 86%, and 96%, respectively, and the check marks next to those scores. In addition, user should not allow Rover to interact with Dog 1, Dog 3, or Dog 4 based on their low compatibility score 610. The threshold compatibility score, for example, can be 80% or some other predetermined value.

Figure 7:
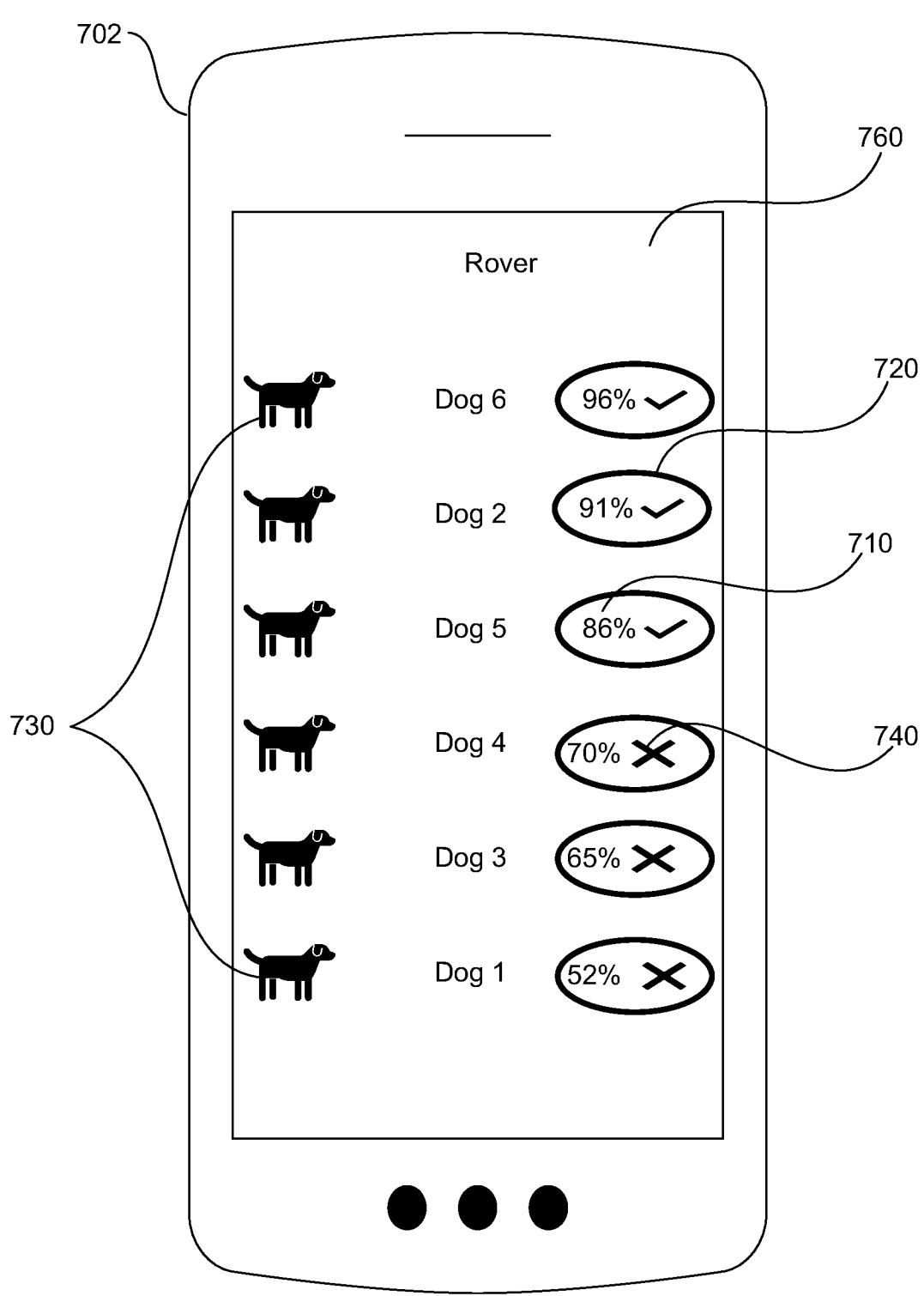
FIG. 7 illustrates an exemplary view of the list of animals with compatibility scores viewed on a user portal.

FIG. 7 illustrates an exemplary view of a list of animals with a compatibility score 710 viewed on a user portal. In this embodiment, user can view a list of dogs that are in the park (or nearby), similar to the map view discussed above. The information provided in this view is the profile picture 730, name, threshold indicia 740, and compatibility score 710 of the dogs currently in the park, or geofenced area 701. In addition, user can view the temperament guide 720 of the dogs in the list view.

Figure 8:
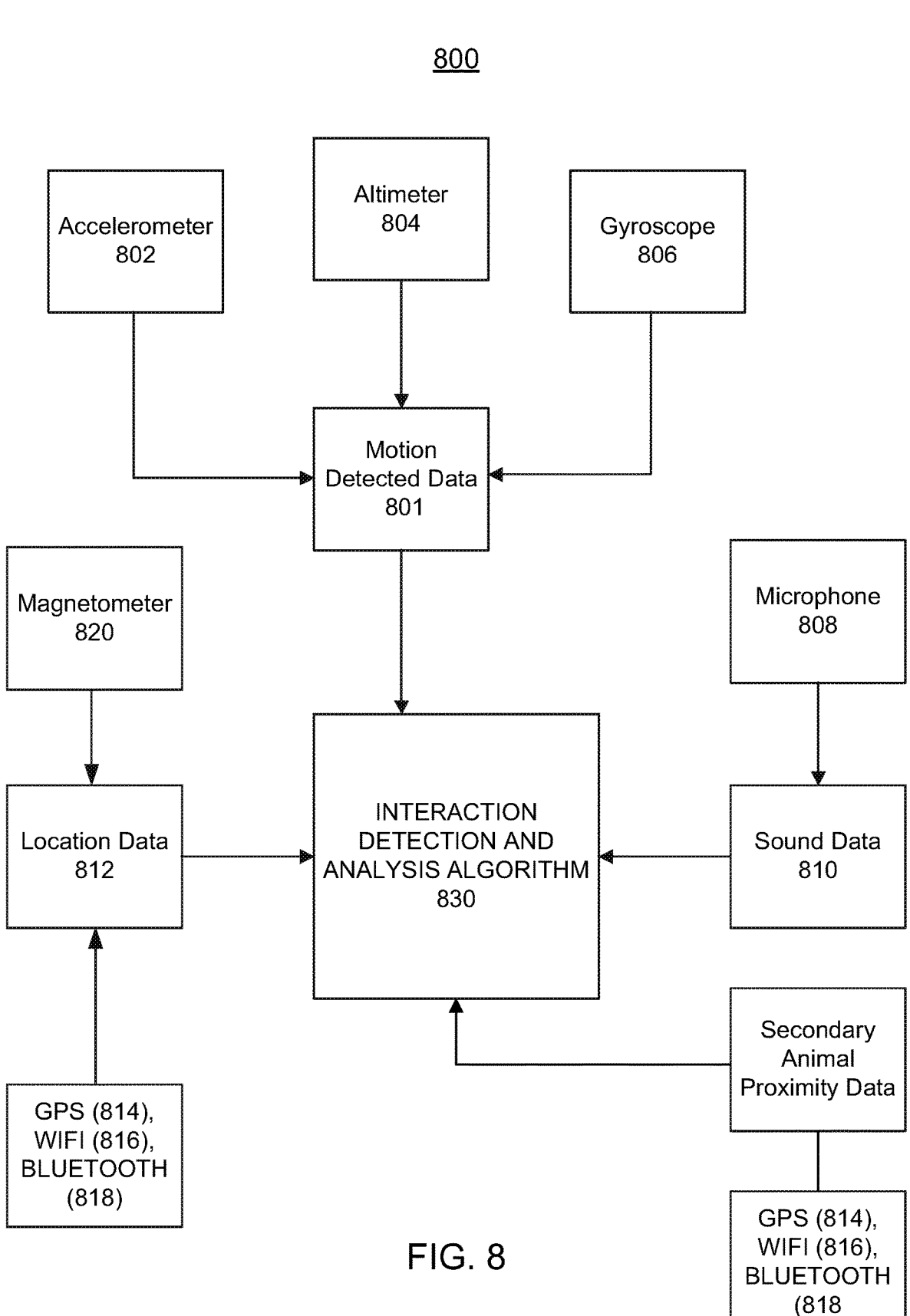
FIG. 8 illustrates a schematic of data and sources as inputs for an interaction detection and analysis algorithm used in calculating a compatibility score.

As noted above, there are various sensors that can be used along with historical and other animal behavior datasets in remote databases that are utilized by and used to improve the interaction detection and analysis algorithms. FIG. 8 illustrates a schematic 800 of these data and sources used as inputs for an interaction detection and analysis algorithm. As shown, accelerometer 802, altimeter 804, and gyroscope 806 sensors can provide data that is used as detected motion data 801. Sound data 810 can be collected by, and received from, a microphone 808. Location data 812 can be collected by, and received from, GPS 814, WIFI 816, Bluetooth 818 or even magnetometers 820. The location data 812 can include data indicative of a position and an orientation of the animal wearing the smart collar 101. Each of these sets of data can be used by an interaction detection and analysis algorithm (830) to determine the type of animal interaction and what mechanisms need to be initiated by the algorithm. This received data can be stored and later uploaded to a remote database and further analyzed to improve upon the algorithms and in particular the algorithm used for the particular pet associated with the smart collar 101. For example, some animals will lean on their owner when they are in the presence of another animal they are scared of Some animals will pant when they are afraid, anxious, or stressed. Some animals will freeze in place and stare at each other with increased intensity which is a sign they are about to become aggressive towards each other. Some animals, like dogs, begin to growl in a unique manner. Some animals crouch, which can be detected using the altimeter 804. These are examples of the types of inputs that can be received and used by the interaction detection and analysis algorithms 830.

Furthermore, the interaction detection and analysis algorithms 830 can be configured to receive secondary animal proximity data 840 of another animal which can similarly be based on GPS 814, WIFI 816, Bluetooth 818 or even magnetometers 820 to determine a position and orientation relative to the first animal wearing the smart collar 101. The interaction detection and analysis algorithms 830 can utilize the secondary animal proximity data 840 to determine a compatibility score between the two animals and output recommendations and/or additional actions (e.g., activate the keep-away mode).

Figure 9:
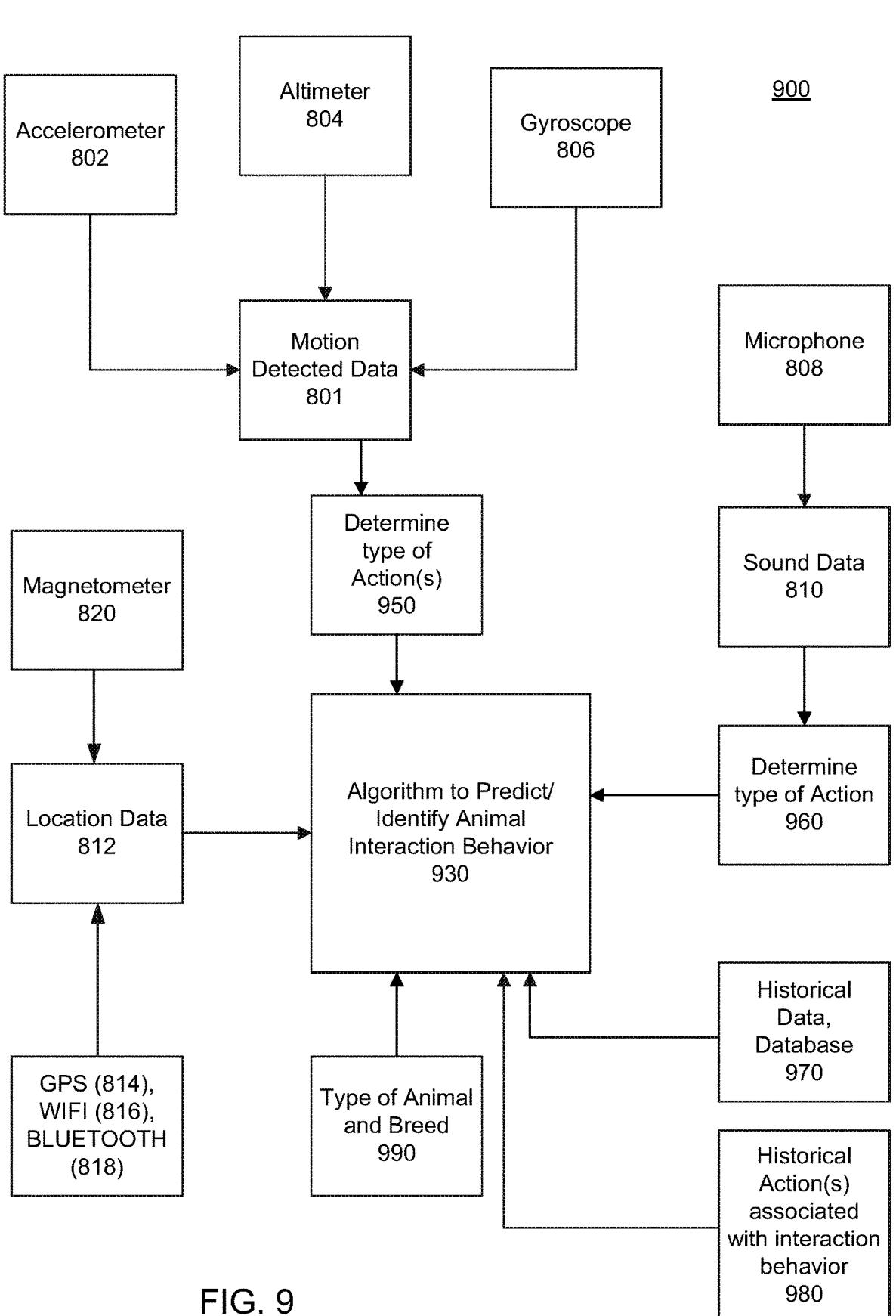
FIG. 9 illustrates another schematic of data and processing sources inputs for predicting and identifying animal interaction data used in calculating a compatibility score.

FIG. 9 illustrates another schematic of data and processing sources inputs for determining animal interaction behavior. Similar to schematic 800, schematic 900 further breaks down how signals received from sensors can be used to determine actions, and those actions can be used alone or in conjunction with other data to determine animal interaction behavior. In addition to the various sensors and inputs shown and described in relation to FIG. 8, the disclosed technology can be configured to determine 950 a type of action that the wearer of the collar is exhibiting based on the motion detected data 801. For example, the disclosed technology can be configured to determine that a wearer of the collar is running, jumping, sitting, sleeping, barking, wagging its tail, eating, etc. based on the motion detected data 801. In response to determining 950 the type of action based on the motion detected data 801, the type of action can be input to the algorithm to predict/identify animal interaction behavior 930. The algorithm to predict/identify animal interaction behavior 930 can be the same as, or different from, the interaction detection and analysis algorithm 830.

The disclosed technology can further including inputting historical data 970 received from the database 105, historical actions associated with interaction behavior 980 (e.g., data related to historical interactions that the wearer of the smart collar 101 has had with other animals), and a type of animal and breed 990. The algorithm to predict/identify animal interaction behavior 930 can then use all of this received data to calculate a compatibility score which is indicative of a likelihood of the personality or behavior of a wearer of the smart collar 101 being compatible with the personality or behavior of another animal.

It should be further noted that actions used to indicate behavior of an animal can vary from animal based on type and breed. Furthermore, an owner's particular animal can have its own set of characteristics, which is one reason recorded historical data and previous action data recorded by the system using the smart collar 101 or other means, such as mobile devices, or manual user inputs, can improve the algorithm at the center of the schematic 900.

It should be understood if not already, that these algorithm's can be learning algorithms such as a machine learning model that can become more accurate over time as the algorithm receives additional data. The machine learning model can, at least initially, include supervised learning, which includes the user input data. Over time as the machine learning model becomes more accurate, the machine learning model can include unsupervised learning, which includes gathering data from multiple smart collars and animals to generate a database of signal information that can be used to refine determined actions and ultimately predict the compatibility of two animals. As noted, the type of sensor data, location, audio and historical data are used to ultimately enable the methods and systems above to analyze and predict, as well as improve with usage.

Figure 10:
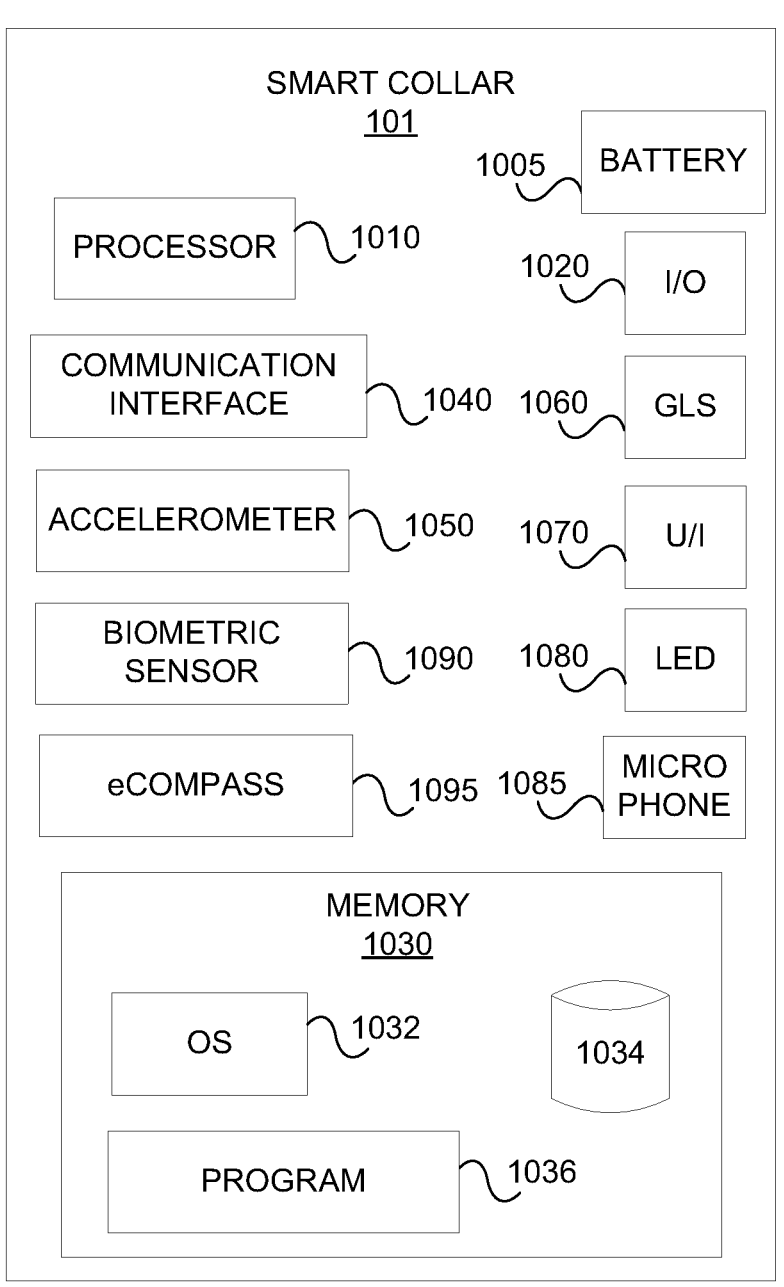
FIG. 10 is a component diagram of an exemplary collar, according to the present disclosure.

An example of the smart collar 101 is shown in more detail in FIG. 10. As will be appreciated, the smart collar 101 can include a strap to attach the smart collar to an animal. As shown, the smart collar 101 can include a battery 1005, a processor 1010; an input/output (I/O) device 1020; a memory 1030 containing an operating system (OS) 1032, a storage device 1034, which can be any suitable repository of data, and/or a program 1036; a communication interface 1040; an accelerometer 1050 or other suitable motion-detecting device; a geographic location sensor (GLS) 1060 for determining the geographic location of the smart collar 101; a user interface (U/I) device 1070 for receiving user input data, such as data representative of a click, a scroll, a tap, a press, or typing on an input device that can detect tactile inputs; and/or a light-emitting diode (LED) 1080 or other suitable light-emitting device. The smart collar 101 can include a biometric sensor 1090 configured to measure or detect biometric information associated with the animal wearing the smart collar 101. The biometric sensor 1090 can include one or more sensors configured to measure heart rate data, blood pressure data, hormonal data, respiratory data, brainwave data, olfactory data (e.g., data corresponding to a smell of the animal wearing the smart collar 101) and/or temperature data (e.g., a body temperature). The smart collar 101 can include a microphone 1085 configured to record audio data (e.g., data corresponding to a cat's meow, a dog's bark, a cough, a sneeze, or other sounds created by the animal wearing the smart collar 101). The smart collar 101 can include an eCompass sensor 1095 (e.g., a magnetometer) to, for example, determine a direction in which the animal wearing the smart collar 101 is facing. As will be appreciated, an eCompass sensor 1095 can enable the smart collar 101 to determine the animal wearing the smart collar 101 is facing another animal wearing another smart collar 101.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed:

1. A method of determining compatibility of two animals, the method comprising:
    receiving first data corresponding to a first animal, wherein the first data is based at least in part on data received from a first smart collar worn by the first animal;
    receiving second data corresponding to a second animal, wherein the second data is based at least in part on data received from a second smart collar worn by the second animal;
    determining a compatibility score based at least in part on the first data and the second data, the compatibility score being indicative of a likelihood that the first animal and the second animal will be compatible;
    determining whether the compatibility score is greater than or equal to a threshold compatibility score; and
    in response to determining that the compatibility score is less than the threshold compatibility score, causing a first smart collar and a second smart collar to activate a keep-away mode.

2. The method of claim 1, further comprising:
    receiving first position data from a first smart collar worn by the first animal;
    receiving second position data from a second smart collar worn by the second animal;

determining, based on the first position data and the second position data, whether the first animal is within a threshold distance from the second animal.

3. The method of claim 2, wherein the determining the compatibility score is done in response to determining the first animal is within the threshold distance from the second animal.

4. The method of claim 1, wherein the keep-away mode is configured to cause the first smart collar and the second smart collar to output a corrective action to cause the first animal and the second animal to separate from each other.

5. The method of claim 4, wherein the threshold distance is a first threshold distance, the method further comprising:
    determining whether the first animal and the second animal are within a second threshold distance from each other, the second threshold distance being less than the first threshold distance; and
    in response to determining that the first animal and the second animal are within the second threshold distance from each other, outputting the corrective action to cause the first animal and the second animal to separate from each other.

6. The method of claim 1, further comprising:
    determining whether the compatibility score is greater than or equal to a threshold compatibility score; and
    in response to determining that the compatibility score is less than a threshold compatibility score, outputting a notification to a user device indicative of the first animal and the second animal likely being incompatible.

7. The method of claim 1, wherein the first data is received from a first user device and the second data is received from a second user device.

8. The method of claim 7, wherein the first data comprises at least a type of breed of the first animal and the second data comprises at least a type of breed of the second animal.

9. The method of claim 7, wherein the first data and the second data comprise at least personality data corresponding to a personality of the first animal and a personality of the second animal.

10. The method of claim 7, further comprising:
    receiving first sensor data from a first smart collar worn by the first animal;
    receiving second sensor data from a second smart collar worn by the second animal;
    wherein determining the compatibility score is based on the first data, the second data, the first sensor data, and the second sensor data.

11. The method of claim 10, wherein the determining the compatibility score comprises assigning a first value to the first data and the second data and assigning a second value to the second sensor data, the second value being greater than the first value.

12. The method of claim 1, wherein:
    the first data is based at least in part on data received from a first smart collar worn by the first animal; and
    the second data is based at least in part on data received from a second smart collar worn by the second animal.

13. The method of claim 12, wherein the data received from the first smart collar comprises at least one of movement data, sound data, and biometric data.

14. The collar of claim 9, wherein the first smart collar and the second smart collar are each configured to:
    determine whether the first smart collar and the second smart collar are within a threshold distance from each other; and in response to determining that the first smart collar and the second smart collar are within the threshold distance from each other, record movement data.

15. A method of determining compatibility of two animals, the method comprising:

receiving first data corresponding to a first animal;

receiving second data corresponding to a second animal;

receiving first position data from a first smart collar worn by the first animal;

receiving second position data from a second smart collar worn by the second animal;

determining, based on the first position data and the second position data, whether the first animal is within a threshold distance from the second animal;

in response to determining the first animal is within the threshold distance from the second animal, determining a compatibility score based at least in part on the first data and the second data, the compatibility score being indicative of a likelihood that the first animal and the second animal will be compatible;

determining whether the compatibility score is greater than or equal to a threshold compatibility score; and in response to determining that the compatibility score is less than the threshold compatibility score, causing the first smart collar and the second smart collar to activate a keep-away mode.

\* \* \* \* \*